United States Patent
Viorel et al.

(10) Patent No.: US 12,470,983 B1
(45) Date of Patent: Nov. 11, 2025

(54) SYSTEM AND METHOD FOR FAST RELAY FOR BANDWIDTH ALLOCATION SIGNALING

(71) Applicant: CABLE TELEVISION LABORATORIES, INC., Louisville, CO (US)

(72) Inventors: Dorin Viorel, Erie, CO (US); Jennifer Andreoli-Fang, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 351 days.

(21) Appl. No.: 17/982,259

(22) Filed: Nov. 7, 2022

Related U.S. Application Data

(63) Continuation of application No. 16/989,154, filed on Aug. 10, 2020, now Pat. No. 11,496,928, which is a continuation of application No. 16/372,124, filed on Apr. 1, 2019, now Pat. No. 10,743,215, which is a continuation of application No. 15/148,260, filed on May 6, 2016, now Pat. No. 10,256,895.

(60) Provisional application No. 62/249,431, filed on Nov. 2, 2015.

(51) Int. Cl.
*H04W 28/20* (2009.01)
*H04B 7/155* (2006.01)
*H04W 84/20* (2009.01)

(52) U.S. Cl.
CPC ........ *H04W 28/20* (2013.01); *H04B 7/15542* (2013.01); *H04W 84/20* (2013.01)

(58) Field of Classification Search
CPC ..... H04W 28/20; H04W 28/16; H04W 28/18; H04W 84/20; H04W 84/045; H04W 16/04; H04B 7/15542
See application file for complete search history.

(56) References Cited

U.S. PATENT DOCUMENTS

| | | | |
|---|---|---|---|
| 2006/0215581 A1* | 9/2006 | Castagnoli | H04L 45/48 370/254 |
| 2006/0259607 A1* | 11/2006 | O'Neal | H04L 12/1868 709/223 |
| 2007/0248072 A1* | 10/2007 | Kwon | H04W 74/02 370/345 |
| 2008/0130550 A1* | 6/2008 | Kim | H04B 7/155 370/315 |
| 2008/0259857 A1* | 10/2008 | Zheng | H04W 72/23 370/329 |
| 2011/0250917 A1* | 10/2011 | Zhu | H04W 24/02 455/509 |
| 2011/0255425 A1* | 10/2011 | Pikkarainen | H04W 48/08 370/252 |
| 2013/0077972 A1* | 3/2013 | Zhang | H04L 12/12 398/58 |
| 2014/0295858 A1* | 10/2014 | Li | H04W 48/06 455/450 |

(Continued)

*Primary Examiner* — Rasheed Gidado
(74) *Attorney, Agent, or Firm* — Cozen O'Connor

(57) ABSTRACT

A system and method for optimizing the end-to-end latency transfer rates over an air interface employing a Multi-hop Relays (MHR). The present system and method provides fast signaling process when no Downlink/Uplink Bandwidth allocation changes are employed, thereby bypassing PHY/

(Continued)

MAC/IP Stack processing. The solution is intended for the new generation of 5G millimeter band multi-hop relays.

26 Claims, 8 Drawing Sheets

(56) References Cited

U.S. PATENT DOCUMENTS

2016/0127997 A1\* 5/2016 Ang ................. H04W 52/0258
370/311

\* cited by examiner

SYSTEM AND METHOD FOR FAST RELAY FOR BANDWIDTH ALLOCATION SIGNALING

RELATED APPLICATIONS

This application is a continuation of U.S. patent application Ser. No. 16/989,154, filed Aug. 10, 2020, which is a continuation of U.S. patent application Ser. No. 16/372,124, filed Apr. 1, 2019 (now U.S. Pat. No. 10,743,215), which application is a continuation of U.S. patent application Ser. No. 15/148,260, filed May 6, 2016 (now U.S. Pat. No. 10,256,895), which application claims priority to U.S. Provisional Application Ser. No. 62/249,431, filed Nov. 2, 2015. All of these prior-filed applications are incorporated herein by reference in their entirety.

BACKGROUND

Wireless relays are infrastructure devices intended for either increasing the user experience in intra-cell coverage holes or for extending the cell coverage. For mobile wireless applications, a complete standardized solution was provided by WiMAX (IEEE802.16-2009) while 3GPP LTE provided a solution (TS 36.116) not pursued commercially. These solutions were particularly designed for their specific RAN solutions.

While the lower frequency bands (≤5 GHZ) exhibit better NLOS propagation performance, the poorer diffraction spread for cm/mm waves (≥20 GHz) causes much higher propagation losses in NLOS scenarios than the lower bands. Since this confines the use cases for cm/mm bands to mostly LOS propagation cases, providing additional intra or extra cell coverage requires to specifying dedicated multi-hop radio relays for the ≥20 GHz bands.

SUMMARY OF THE INVENTION

This solution provides a fast signaling algorithm when no DL/UL BW allocation changes are employed, thus bypassing PHY/MAC/IP Stack processing thus decreasing the related control and user latency times. The solution is intended for the new generation of 5G mm band multi-hop relays. This solution also proposes idle and wake-up algorithms for 5G multi-hop relays.

In an embodiment fast downlink bandwidth allocation system is configured with a first level hierarchical device in a multi-hop relay hierarchical network formed of at least a first, second, and third level node. The fast downlink bandwidth allocation system is configured to include at least a non-transitory memory, an uplink bandwidth module, a PHY module, a scheduler, and a processor. The non-transitory memory is configured to store an allocation data, a first uplink fast feedback data (UFFD) associated with a previous data frame, and an uplink bandwidth allocation request data. The uplink bandwidth module is configured for processing the uplink bandwidth allocation request data to produce a processed uplink bandwidth allocation data which is written to the allocation data in the non-transitory memory. The PHY module is configured to provide conditional instructions to the uplink bandwidth module to decode the uplink bandwidth allocation request. The scheduler is configured to schedule bandwidth allocation for the second and third level nodes based on the allocation data. The processor is in communication with the non-transitory memory, the uplink bandwidth module, the PHY module, and the scheduler for cooperating in bandwidth allocation computational processes. Cooperatively, these components implement the fast downlink bandwidth allocation method, which conditionally bypass decoding bandwidth allocation data and advantageously transmits previously decoded bandwidth allocation data, thereby reducing processing latency.

In an embodiment, the present method manages the fast downlink bandwidth allocation in a multi-hop relay hierarchical network. This method accesses a first downlink fast feedback data (DFFD) stored in a non-transitory memory and associated with a previous bandwidth allocation data from a previous data frame. Furthermore, the present method receives an encoded downlink bandwidth allocation data associated with the current frame from a master multi-hop relay and a second DFFD associated with the current frame from a master multi-hop relay. The second DFFD associated with the current data frame is accessed and compares with the first DFFD to determine a difference between the current and the previous downlink bandwidth allocation data. Based on a determination that there is no difference between the first and second DFFD, the method may then skip processing/decoding the encoded downlink bandwidth allocation data and transmit the bandwidth allocation data as per a previous frame. Alternatively, if the method determines that there is that a difference between the first and second DFFD, the method decodes the encoded downlink bandwidth allocation data and transmits the decoded bandwidth allocation data to one or more third level nodes.

In another embodiment, a fast downlink bandwidth allocation system configured with a second level node in a multi-hop relay hierarchical network formed of at least a first, second, and third level node is employed. Such a system includes a non-transitory memory, a downlink bandwidth module, a PHY module, a scheduler, and a processor. The non-transitory memory is configured to store a bandwidth allocation data, a received bandwidth allocation data, and a first downlink fast feedback data (DFFD) associated with a previous data frame. The downlink bandwidth module is configured to process the received bandwidth allocation data to produce a processed bandwidth allocation data which is written to the bandwidth allocation data in the non-transitory memory. The PHY module is configured to provide conditional instructions to the downlink bandwidth module related to processing the received bandwidth allocation data. The scheduler is configured to schedule bandwidth allocations for at least the third level nodes based on the bandwidth allocation data. The processor is in communication with the non-transitory memory, the downlink bandwidth module, the PHY module, and the scheduler for cooperating in bandwidth allocation computational processes.

BRIEF DESCRIPTION OF THE INVENTION

DETAILED DESCRIPTION OF THE FIGURES

The following are acronyms and abbreviations for the associated phrases, which are used in the present application:

FAS—Fog Access Server
HFC—Hybrid Fiber-Coax
LTE—Long Term Evolution
MHRR—Multi-Hop Radio Relay
MTC—Machine Type Communications
M2M—Machine-to-Machine Communication
RAN—Radio Access Network
RU—Radio Unit 5th generation wireless system (5G) radio links are expected to support one gigabits per second (Gbps) or more on-demand end-user data rates. This will require large bandwidth support, currently only available in the centimeter/millimeter (mm) bands, for example, from 20-100 GHz. In addition, 5G radio links are also expected to support very low transfer latencies optimizing the end to end latency. This may be accomplished by employing fast transfer radio relays with optimized latency times.

The present system and method present low latency transfer optimizations by optimizing the end-to-end latency transfer rates over a Multi-Hop Relay (MHR) air interface by tracking changes to each users downlink bandwidth allocation. In one embodiment, the present system and method employs a logical downlink lookup table backed by a Physical Fast Signaling Channel (PFSCh) and a new logical uplink feedback table backed by a Physical UL Bandwidth Feedback Channel (PUBFCh). As compared to the prior art techniques the optimizations disclosed herein provide improved efficiency for long packets transmitted over the air, one non-limiting example is streaming of video data.

The following description utilized the terms "slave" or "a slave" and "slave too," and correspondingly "master" to describe the relationship between devices in the hierarchical communication structures described herein, all of which reflects the direction of user data transmission. One example of a hierarchical structure that may be utilized in the present system is as follows from the highest position in the hierarchical structure to lowest: Master MHR, slave MHR, pico-base station (pBS), and remote unit (RU). By way of example, a slave MHR device is slave to a master MHR device, a pBS device is slave to a slave MHR device, and a RU is slave to a pBS. Furthermore, any device lower in the hierarchical structure may be slave to any device higher in the structure, e.g., a RU may be slave to a slave MHR or a master MHR. Other hierarchical structures may be utilized and/or more or fewer devices may be included into a hierarchical structure utilized by the present invention without departing form the scope here.

Figure 1:
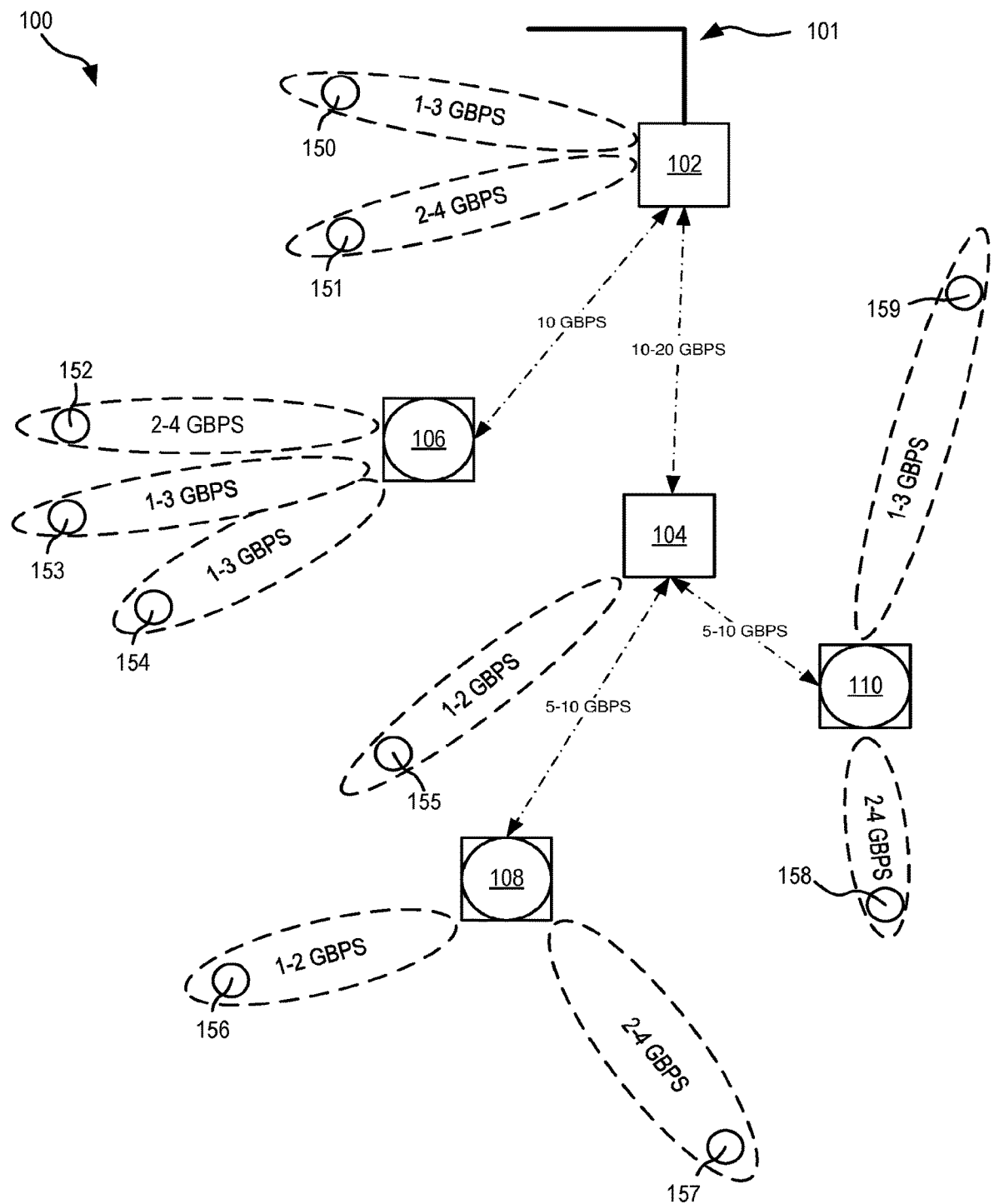
FIG. 1 shows one multi-hop relay (MHR) network architecture, in an embodiment.

FIG. 1 shows a MHR network 100 architecture. In the embodiment of FIG. 1, network 100 is a low-latency fronthaul network that provides, for example, up to 40 Gbps over the air utilizing millimeter (mm) wave bands Network 100 includes a master MHR 102 and a slave MHR 104. MHR 102 is in communication with a high capacity 10/40 Gbps Passive Optical Network (PON) 101. Other high capacity data networks may be utilized without departing from the scope herein. Each MHR 102, 104 is in wireless communication with each other, one or more base stations, shown in the embodiment of FIG. 1 as pico-base stations (pBS) 106-110, and a plurality of radio units (RUS) 150-159. Master MHR 102 provides wireless services to RU 150 via a 1-3 Gbps signal and RU 151 via a 2-4 Gbps connection, pBS 106 via a 10 Gbps connection, and slave MHR 104 via a 10-20 Gbps connection. pBS 106 is in wireless communication with RU 152 via a 2-4 Gbps signal and RUs 153-154 via 1-3 Gbps signals. Hence, master MHR 102 may provide converged access/fronthauling services. Slave MHR 104 is in wireless communication with pBS 108 and 110 via a 5-10 Gbps connection and RU 155 via a 1-2 Gbps connection. pBS 108 is in wireless communication with RU 156 via a 1-2 Gbps connection and RU 157 via a 2-4 Gbps connection. pBS 110 is in wireless communication with RU 158 via a 2-4 Gbps connection and RU 159 via a 1-3 Gbps connection. It will be understood by one skilled in the art that data rates, number and type of connections, and number of connected devices presented in FIG. 1 are for descriptive purposes only and other implementations may be realized without departing from the scope herein. It will also be understood by the skilled artisan that data rates may vary dependent on, e.g., end user data requirements. Network 100 may include more or fewer MHRs (masters and slaves), pBS, RU, and/or other devices not specifically disclosed here and/or lower and higher throughput rates without departing from the scope herein or affecting the generality of the concept. It will be understood that pBSs 106-110 are merely exemplary of any small cell base station and one skilled in the art will understand that a pBSs 106-110 may be preplaced with other base stations, such as but not limited to femtocell base stations, microcell base stations, Home Node B, Wi-Fi components, and systems configured to interface using GSM, CDMA2000, TD-SCDMA, W-CDMA, LTE, and WiMax.

In a MHR network, like that of network 100, clusters of small cells are serviced by multi-hop relays (MHR). By way of example, pBS 106 and RUs 152-154 are serviced by master MHR 102 and pBS 108 and RUs 156-157 are serviced by slave MHC 104. In different embodiment, multi-hop relays may service other hierarchical MHR and/or pBS slaves, and may directly service RUs. The skilled artisan will recognize this type of service as a convergent access and distribution wireless service. The access method described herein is considered a fronthaul type of traffic as opposed to the PON backhaul services.

In an embodiment concerned with user data latency in a MHR network architecture the number of hierarchical hops utilized to traverse the network may be limited, for example, to less than or equal to 2 hops, for example, from a MHR to a pBS. Direct distribution to RUs, e.g., RUs 156-157, are not considered hops when discussing the traverse of a MHR network. For example, data transmitted to RU 157 that data's first hop is from master MHR 102 to slave MHR 104 and its second hop is from slave MHR 104 to pBS 108. From pBS 108 data is distributed utilizing known techniques to RU 157. In another example, data transmitted to RU 155 only requires a single hop, that is, from master MHR 102 to slave MHR 104. From slave MHR 104 data is distributed utilizing known techniques to RU 155.

It will be understood by the skilled artisan that MHR networks, like network 100, may be implemented employing suitable space diversity methods as a hybrid beam-forming/ MIMO for over the air traffic improving, for example, both 10+Gbps throughput and coverage both in line of sight (LOS) and non-line of sight (NLOS) cases.

In the embodiment of FIG. 1, a millimeter wave band network may be configured and arranged as a convergent fronthaul/access capability MHR network. Such a convergent MHR network may support high throughput remote units, for example, remote units having 1-5 Gbps speeds and multi-hop relays that provide over the air fronthaul capability, such as 10-20 Gbps capacity shown between MHR 102 and MHR 104.

One problem in such a convergent MHR network is delays associated with one or more of the PHY, MAC, and IP layers. Optimizing MHR processing at these layers can beneficially reduce latency to, for example, between one (1) and five (5) milliseconds. Solutions to this problem are presented below.

Figure 2A:
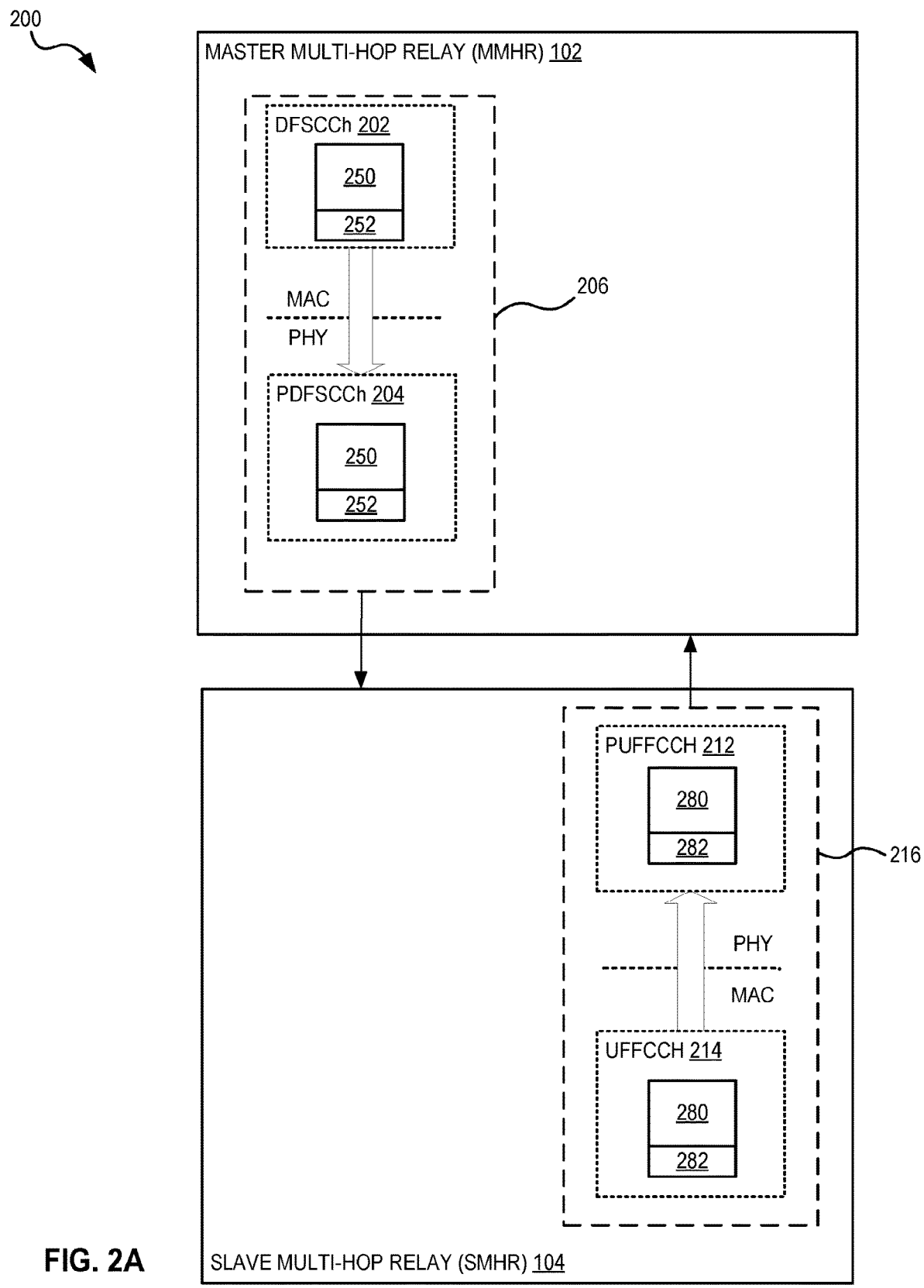
FIG. 2A shows one slave MHR latency optimization, in an embodiment.

FIG. 2A shows a system 200 utilized in optimizing network 100 latency. System 200 is shown with master MHR 102 and slave MHR 104 of FIG. 1. The principle of operation utilizes a downlink control channel 206 and an uplink control channel 216 to reduce latency within network 100.

The downlink control channel 206 includes a Downlink Fast Signaling Control Channel (DFSCCh) 202 and a PHY DFSCCh (PDFSCCh) 204. DFSCCh 202 is a logical (i.e., MAC Channel) downlink supporting logical communication flow between master MHR 102 to slave MHR 104. PDFSCCh 204 is a downlink support PHY control channel for transporting MAC data The uplink control channel 216 includes a PHY UL Fast Feedback Control Channel (PUFFCCh) 212 and an UL Fast Feedback Control Channel (UFFCCh) 214. PUFFCCh 212 is a logical uplink slave MHR 104 to master MHR 102 control channel. UFFCCh 214 is a logical uplink slave MHR to master MHR control channel. PUFFCCh 212 is the supporting PHY transport control channel.

DFSCCh 202 and PDFSCCh 204 are shown including data 250 and 252. Data 250 is the received downlink and uplink bandwidth allocation data. Downlink fast feedback data 252 (also called herein "DFFD 252" or "data 252") is fast signaling downlink PHY resource allocation data, which quickly conveys information regarding any change in one or both of the downlink or uplink bandwidth allocation data. That is, DFFD 252 only indicates if a change has occurred, not what that change is. To accomplish fast signaling to reduce latency a receiving device first process DFFD 252 to determine if a change has occurred to bandwidth allocations. If no change has occurred the receiving device utilizes the same bandwidth allocation as used in the previous frame, thus eliminating the need to process data 250. If a change has occurred the receiving device only then will processes data 250. For more details see FIG. 2B and the associated description. DFFD 252 may be transmitted in, for example, hexadecimal format as shown in Table 1, below. Uplink fast feedback data 282 may be transmitted in, for example, hexadecimal format as shown in Table 3, below.

UFFCCh 214 and PUFFCCh 212 are shown including uplink bandwidth allocation request data 280 and uplink fast feedback data 282 (also called here "UFFD 282" or "data 282"). Data 280 and data 282 represent control information. UFFD 282 contains data directed to identifying changes in UL bandwidth allocation requests. Data 280 contains all UL bandwidth allocation data for a given receiving device. UFFD 282 may be process first to determine if data 280 should be decoded/processed. If UFFD 282 shows no change to UL bandwidth allocation request since the last frame, data 280 can be ignored and the receiving device may allocate bandwidth as per the previous frame. In one example, to accomplish fast signaling to reduce latency a master MHR 102 first process data 282 to determine if a change has occurred to UL bandwidth allocation requests from slave MHR104. If master MHR 102 processes data 282 and determines no changes to the UL bandwidth allocation request has occurred then master MHR 102 utilizes the same UL bandwidth allocation as utilized in the previous frame, and processing of data 280 does not occur. Eliminating the processing of data 280 reduces latency within the system. If master MHR 102 determines a change in the UL bandwidth allocation request has occurred then master MHR 102 processes data 280. For more details see FIG. 2C and the associated description.

In an alternative embodiment only data 280 is present. If there is a change to the UL bandwidth allocation request then data 280 is sent, for example, from slave MHR 104 to master MHR 102. If no change is requested, then no data is sent. Thus if master MHR 102 does not receive a new UL bandwidth allocation request, then master MHR 102 utilizes the same UL bandwidth allocation utilized in the previous frame.

Figure 3:
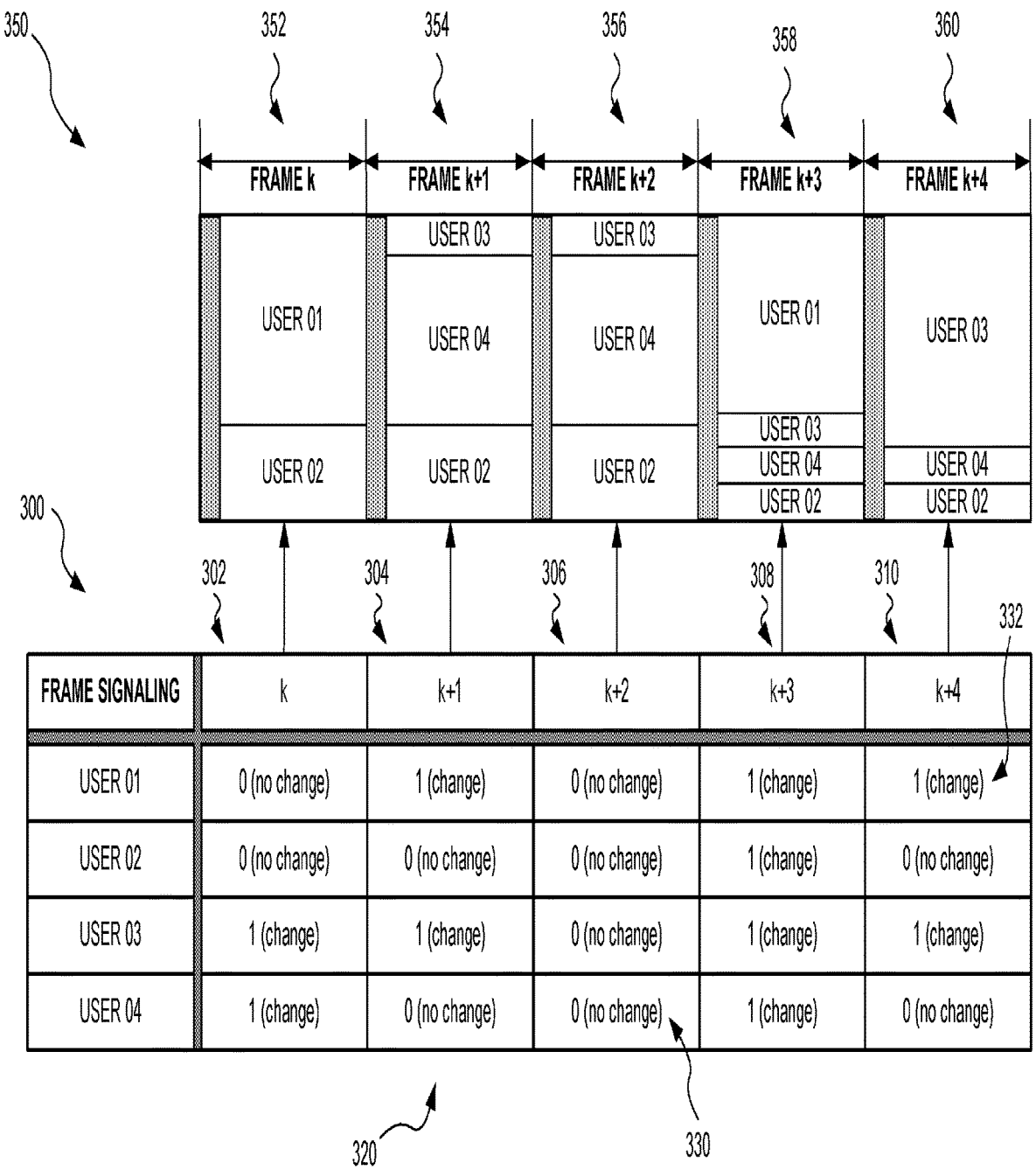
FIG. 3 shows one downlink allocation monitoring process in an exemplary downlink look up table implementation, in an embodiment.

Master MHR 102 transmits bandwidth allocation data, for example fast control/signaling data as shown in is FIG. 3, via downlink control channel 206. Processing of transmitted downlink control channel 206 may be handled by a downlink bandwidth allocation monitoring scheme, one example of which is method 400 of FIG. 4, below. The downlink bandwidth allocation monitoring scheme monitors and generates data associated with changes in user downlink bandwidth allocation on a frame by frame basis. In an embodiment, this data is stored in a quickly accessible format, such as a downlink lookup table which is transmitted by master MHR 102 via PDFSCCh 204 to the slave MHR104. The examples that follow are discussed utilizing a Downlink PHY resource allocation data (e.g., see Table 1, below, and Downlink PHY resource allocation data 300, FIG. 3). In the present embodiment Downlink PHY resource allocation tables are transmitted over the logical PHY Fast Signaling Control Channel (PFSCCh). One skilled in the art will appreciate that Downlink PHY resource allocation tables are not that only manner in which this data can be transmitted and that other systems, data structures, and process may be utilized without departing from the scope here.

DFSCCh 202 and its transport channel PDFSCCh 204 form a downlink control channel 206. Downlink control channel 206 communicates with slave MHR 104 any changes that occur in the downlink bandwidth allocation via Downlink PHY resource allocation tables. Downlink control channel 206 signal may be, for example, on a frame-by-frame and/or user-by-user basis. See FIG. 4 and its associated description for more detail.

In an embodiment, DFSCCh 202 is signaled via a fast PHY/RF channel which benefits from not requiring processing MAC and the related IP Stack data. Thus when there are no changes in the downlink bandwidth allocation from one frame to the next, fast processing of the downlink bandwidth allocations may be used to reduce the end-to-end latency time.

Regarding communication in the uplink (UL) direction, slave MHR 104 signals to master MHR 102 any changes to the UL bandwidth allocations via an uplink channel 216, e.g., a pair of PHY/MAC channels. In the embodiment shown in FIG. 2, the pair of PHY/MAC channels are PUFFCCh 212 and UFFCCh 214.

UFFCCh 214 processes and hands-off MAC layer UL bandwidth allocations data to the PHY layer, where PUFFCCh 212 processes the UL bandwidth allocations for transmission to master MHR 102. If there are no changes to the UL bandwidth allocations in the next data frame then master MHR 102 allocates UL data as per the previous frame. Else, if slave MHR 104 sends a new UL PHY resource allocation via the pair of PHY/MAC channels then master MHR 102 processes the change in the PHY UL allocations. Processing the change in the new PHY UL allocations include at least updating the DL bandwidth allocation for transmission to one or more nodes lower in the hierarchical structure, for example, slave MHR 104.

Figure 2B:
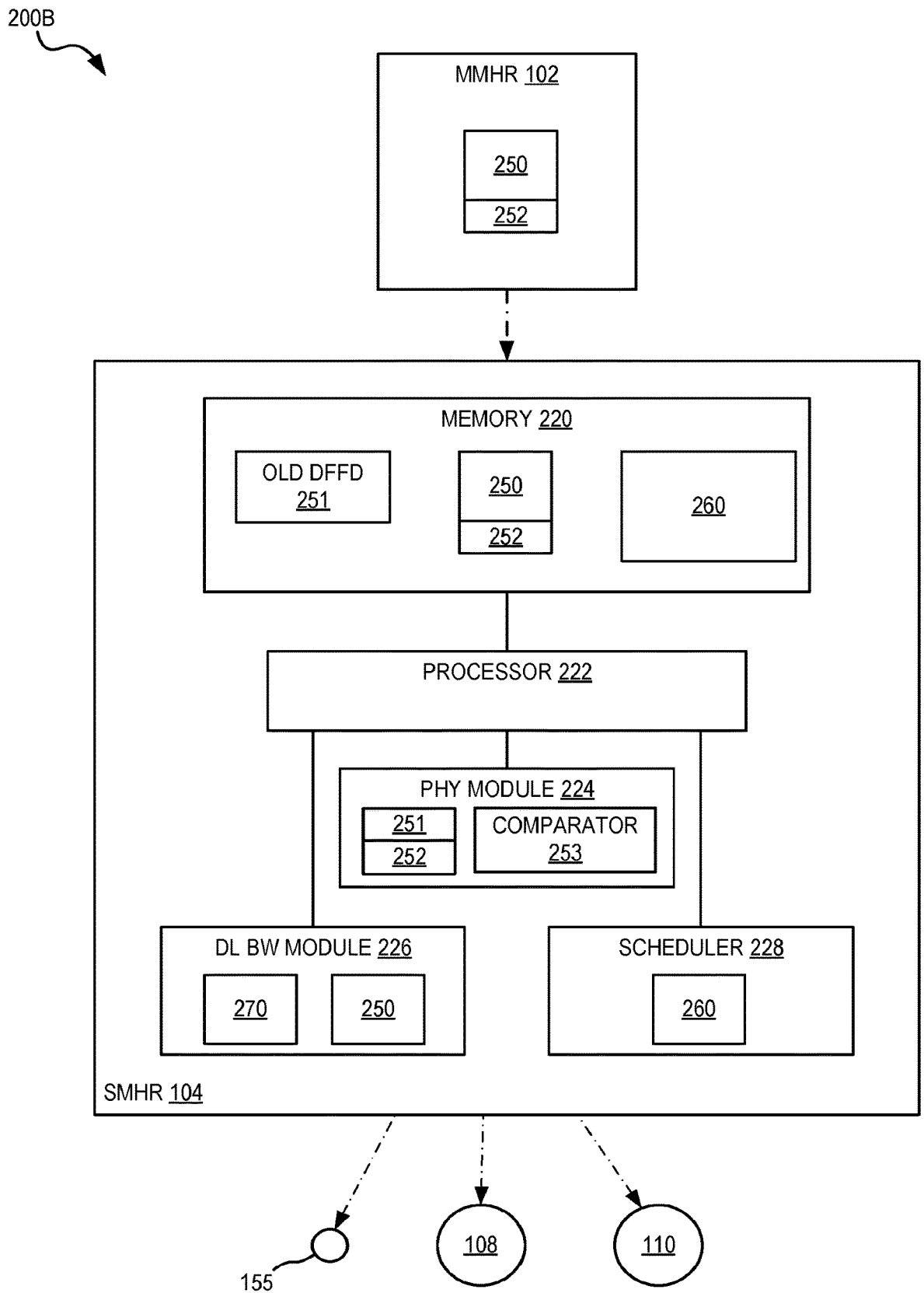
FIG. 2B shows exemplary system for processing downlink bandwidth allocation, in an embodiment.

FIG. 2B shows exemplary system 200B for processing downlink bandwidth allocation. System 200B includes master MHR 102 and slave MHR 104 in communication with one another, and RU 155, pBS 108 and pBS 110 in communication with slave MHR 104. Slave MHR 104 includes a memory 220, and a processor 222 in communication with a PHY module 224, a DL BW module 226, and a scheduler 228. Master MHR 102 includes data 250 and data 252 as described in FIG. 2A. Master MHR 102 transmits data 250 and data 252 to slave MHR 104, which stores data 250 and data 252 in memory 220. Memory 220 also contains old downlink fast feedback data (DFFD) 251 and bandwidth allocation data 260. PHY module 224 processes data 252 to determine if bandwidth allocation data 260 needs to be updated. In an embodiment, PHY module 224 executes a comparator 253 to compare data 251 and data 252. If comparator 253 determines that there is a difference between the old bandwidth fast feedback data 251 and the downlink fast feedback data 252, then PHY module determines that bandwidth allocation data 260 needs updated. If comparator 253 determines that there is no difference between the old bandwidth fast feedback data 251 and the downlink fast feedback data 252, then PHY module determines that bandwidth allocation data 260 does not need to be updated.

If PHY module 224 determines that bandwidth allocation data 260 does not need updated then data 250 is not processed and scheduler 228 executes bandwidth allocation as pre the previous frame, that is, as contained in unaltered bandwidth allocation data 260. If, when processing data 252, PHY module 224 determines that there is a change to the downlink bandwidth allocation then DL BW module 226 processes data 250, producing a processed bandwidth allocation data 270 for updating bandwidth allocation data 260 in memory 220. Updated data 260 is then utilized by scheduler 228 to allocated new downlink bandwidth allocations to RU 155, pBS 108, and pBS 110.

Figure 2C:
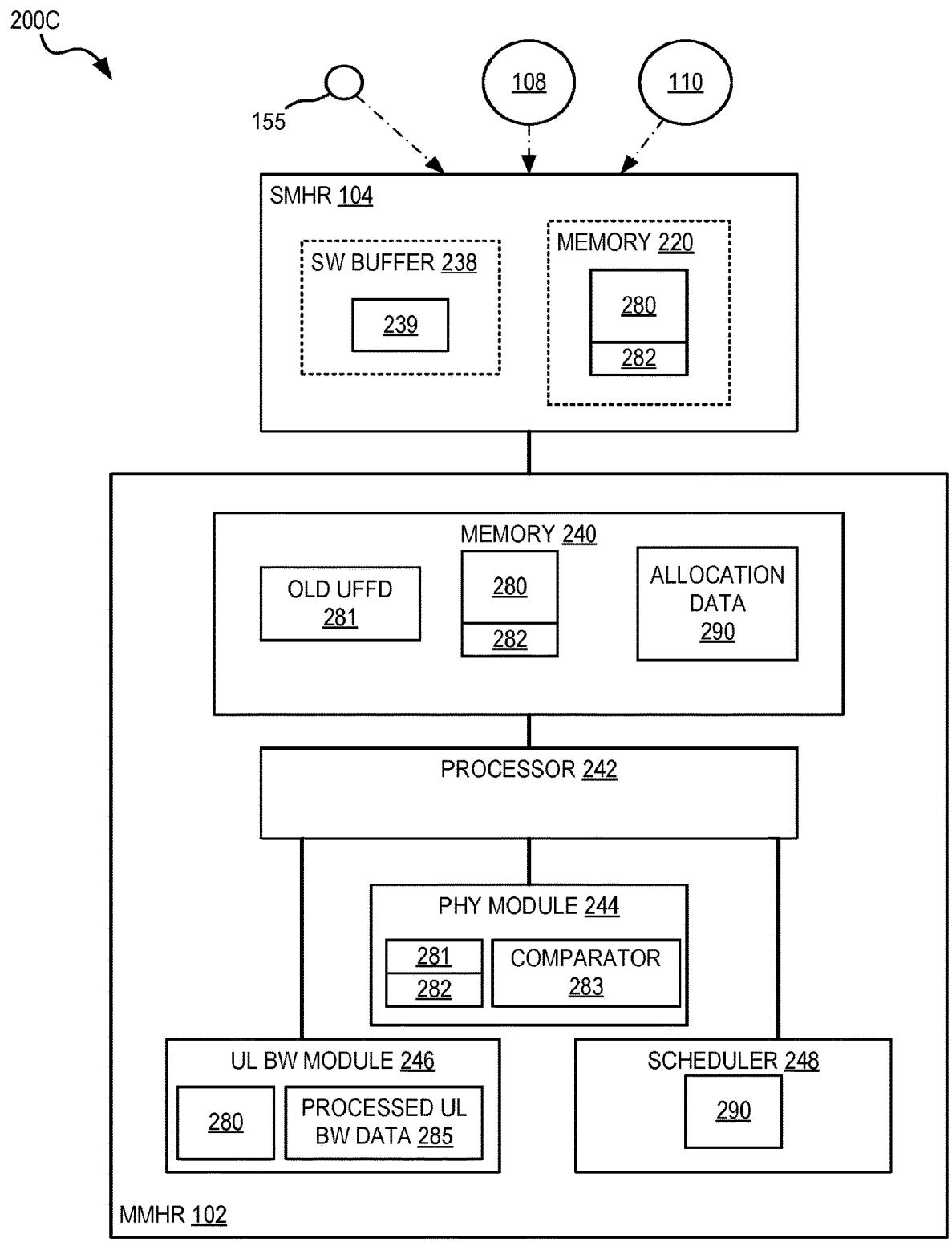
FIG. 2C shows exemplary system for processing uplink bandwidth allocation requests, in an embodiment.

FIG. 2C shows exemplary system 200C for processing uplink bandwidth allocation requests. System 200C includes master MHR 102 and slave MHR 104 in communication with one another, and RU 155, pBS 108, and pBS 110 in communication with slave MHR 104. Slave MHR 104 is shown including memory 220 which stores data 280 and 282 as described in FIG. 2A and a variable sized software buffer 238 storing uplink bandwidth allocation request data 239. Master MHR 102 includes a memory 240, and a processor 242 in communication with a PHY module 244, a UL BW module 246, and a scheduler 248.

RU 155, pBS 108, and pBS 110 transmit UL bandwidth allocation requests to slave MHR 104, which are first stored in software buffer 238 as data 239. In an embodiment, software buffer 238 changes size to accommodate the size of data stored therein. Data 239 is then process to generate data 280 and 282. Slave MHR 104 then produces data 282 which details any changes in the current UL bandwidth allocation requests from the previous UL bandwidth allocation requests. Slave MHR 104 transmits data 280 and data 282 to master MHR 102, which stores data 280 and data 282 in memory 240. Memory 240 also contains UL bandwidth allocation data 290 and old UFFD 281. PHY module 244 is shown to include a copy of data 282, a copy of old UFFD 281, and a comparator 283. PHY module 244 processes data 282 to determine if UL bandwidth allocation data 290 needs to be updated, that is, if there is a change in the current UL bandwidth allocation request, stored as data 282, as compared to the previous UL bandwidth allocation request, stored as an old UFFD 281. In the embodiment of FIG. 2C, processing data 282 to determine if UL bandwidth allocation data 290 needs to be updated is accomplished by utilizing comparator 283 to compare old UFFD 281 with data 282 to determine if there is a difference between the two. If PHY module 244 determines that UL bandwidth allocation data 290 does not need updated then data 280 is ignored and scheduler 248 executes UL bandwidth allocation as per the previous frame, that is, as contained in data 290. If, when processing data 282, PHY module 244 determines that there is a change to the uplink bandwidth allocation request then UL BW module 246 processes data 280, which produces processed UL bandwidth data for updating allocation data 290. Updated data 290 is then utilized by scheduler 248 to allocated new downlink bandwidth allocations.

FIG. 3 shows downlink PHY resource allocation data 300, which is represented as a data structure for storing downlink data in memory for quick access. Data 300 shows one representation of data contained in or as a source for data 252 of FIGS. 2A and 2B. Also shown in FIG. 3 is the relationship between downlink PHY resource allocation data 300 and data frames 350. Data frames 350 show the result of allocated downlink bandwidth, which is communicated by, for example, data 250 of FIGS. 2A and 2B.

Data frames 350 are shown to include five frames, frame (k) 352 through frame (k+4) 360. Frame (k) 352 includes data bandwidth allocations for user 01 and user 02; frame (k+1) 354 includes data bandwidth allocations for user 03, user 04, and user 02; frame (k+2) 356 includes data bandwidth allocations for user 03, user 04, and user 02 (same as the previous frame, frame (k+1)); frame (k+3) 358 includes data bandwidth allocations for user 01, user 03, user 04, and user 02; and frame (k+2) 356 includes data bandwidth allocations for user 03, user 04, and user 02. The amount of bandwidth allocation provided to users 03, 04, and 02 in frames (k+1) and (k+2) are of the same size, while the amount of bandwidth allocation provided to users 03, 04, and 02 in frame (k+4) is of a different size as compared to that of frames (k+1) and (k+2), that is, the same users are allocated bandwidth, but the amount of bandwidth is different. For example, the amount of bandwidth allocated to user 03 in frame (k+4) is much large than that provided to user 03 in frame (k+1) and (k+2).

Downlink PHY resource allocation data 300 is formed of columns 302-308 associated with data frames 352-360 and rows associated with users. In the example of FIG. 3 only five columns 302-310 related to data frames (k) 352 through (k+4) 360, and four users, user 01 through user 04, are shown. More or fewer data frame related columns and users may be included in a downlink PHY resource allocation table without departing from the scope herein. Examples of users 01-04 are RUs 152, 153, 154, and User 04 (not shown) of FIG. 1 for which DL bandwidth was allocated from pBS 106 as instructed by master MHR 102.

Downlink PHY resource allocation data 300 is utilized, for example by slave pBS 106, to determine if a change has occurred in any of user 01-04's downlink bandwidth allocations compared with, for example, the previous frame. All of the following examples are described utilizing the comparison of a current frame with a frame immediately preceding it. It will be understood by the skilled artesian that a downlink PHY resource allocation table, like downlink PHY resource allocation data 300, may be used in the comparison of a current frame to any one of the previous frame for purposes of reducing data access time, processing time, and/or latency.

One or more embodiments may use semi-persistent PHY allocations which could employ PHY resource allocation changes using as a reference one or more frames prior to the current frame.

In another embodiment the system saves a plurality of previous processed downlink bandwidth allocations to memory and associated each to its respective frame. As such, the system may provide a comparison not only to the immediately preceding frame but to any of or all of the plurality of preceding frames with data saved to memory to identify a previously processed downlink bandwidth allocation that is the same as required by the current frame. Such as system may advantageously reduce processing time and latency. In addition, such a system may reduce an amount of supporting control information, for example, in the embodiments that utilize semi-persistent PHY resources allocations for specific types of traffic. One example of a specific type of traffic includes but is not limited to VoIP traffic.

Data contained in data fields of data 320 are the results of comparisons, on a user by user basis, of downlink bandwidth allocations for a first frame and a second frame immediately preceding the first frame. Entries in the data fields of data 320 may be, for example, a zero (0) or a one (1). A zero (0) in a data field represents no change in a user's downlink bandwidth allocation for a given frame as compared the frame immediately preceding it. As such the same bandwidth allocation may be reused without further processing. A one (1) in a data field represents a change has occurred in a user's downlink bandwidth allocation for a given frame as compared the frame immediately preceding it. As such, the slave will process the received downlink IP stack received from the master, and execute the required new time/data allocation requests. This is a time consuming process and advantageously avoid by the present system and method's recycling of previous downlink bandwidth allocations when the present system and method has determined no changes have been made to the downlink bandwidth allocations since, for example, the previous frame. In an example of user 04, the result of a comparison of frame (k+2) 356 and previous frame (k+1) 354 produces in the entry in data field 330 in data 300, which is zero (0) indicating no change in bandwidth allocation for user 04 as compared to previous frame (k+1). This informs the system that no change has occurred in the downlink bandwidth allocation since the last frame, such that the downlink bandwidth allocation used in frame (k+1) 354 may be used again in frame (k+2) 356 thereby reducing processing time and latency. In another example looking at user 01, the result of a comparison of frame (k+4) 360 and frame (k+3) 358 produces the entry of one (1) in data field 332 of data 300. This informs the system that a change has occurred in the downlink bandwidth allocation since the last frame such that the new downlink bandwidth allocation must be used in frame (k+4) 360. Preparing a new downlink bandwidth allocation utilizes a multistep process, one example of which is described in see FIG. 4 and its associated description, that requires processing time and adds to latency as compared to there being no change in downlink bandwidth allocation.

In an embodiment, MHRs service up to 16 or 32 high capacity users at ≥1 Gbps. Without losing the generality, more or fewer users may be serviced, usually allocated in binary multiples.

Figure 4:
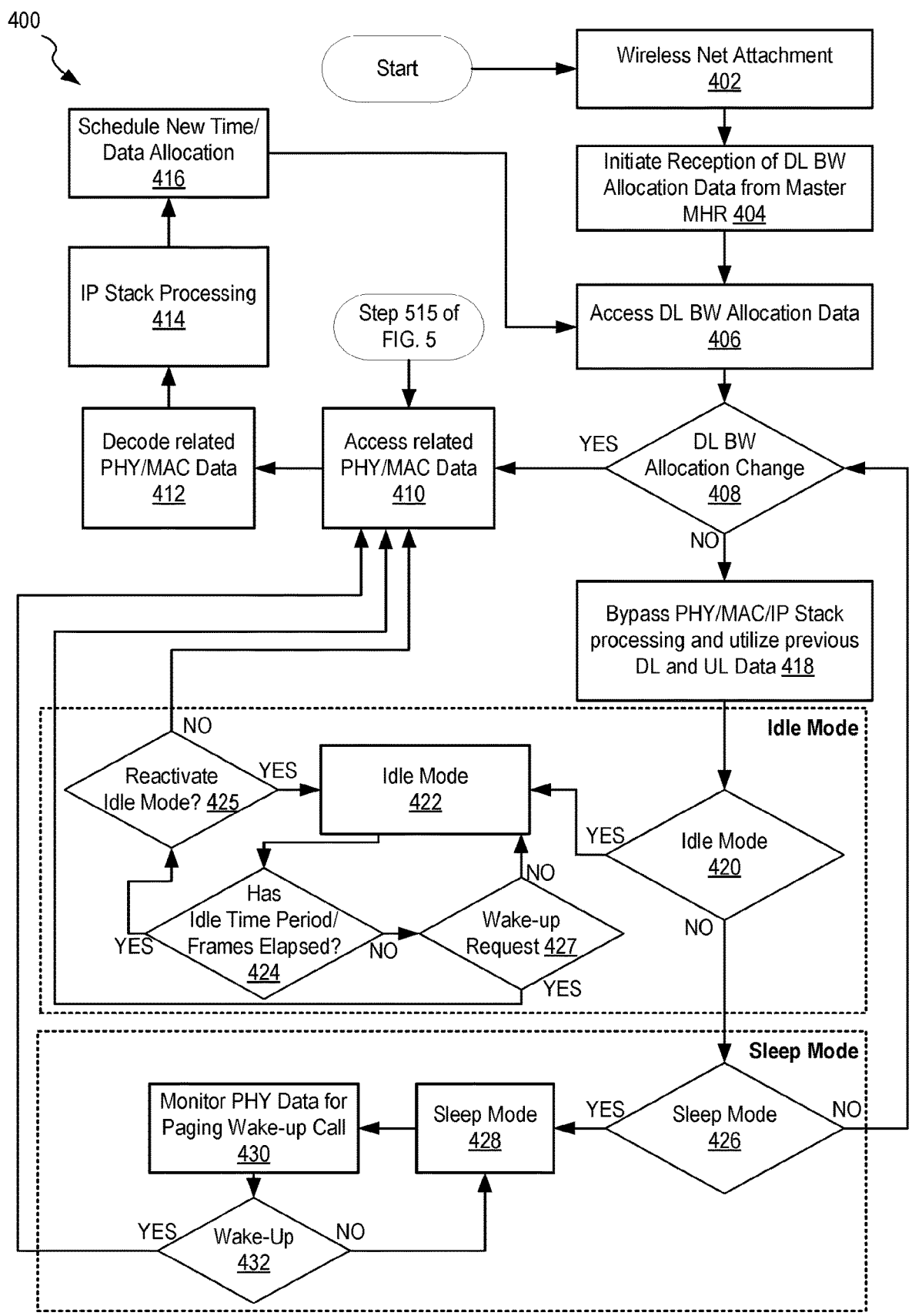
FIG. 4 is a flowchart illustrating one exemplary method for slave MHR downlink bandwidth (DL BW) allocation, in an embodiment.

FIG. 4 shows a MHR DL BW allocation process, method 400, for example, implemented by slave MHR 104 of FIG. 1. Method 400 minimizes downlink processing latencies when no new downlink time PHY resource allocations are required.

In step 402 of method 400, MHR's are activated and one or more slave MHRs are linked to a master MHR wirelessly. In the example of network 100, slave MHR 104 is associated with master MHR 102 via a wireless link.

In step 404 of method 400, following the reception of the PDFSCCh, an update of downlink bandwidth allocation data is initiated. Also, if it is not already active, a scheduler is started for scheduling data transmissions from slave MHR to each of its associated wirelessly connected devices. One example of step 404 is master MHR 102 and slave MHR 104 coordinating for a transmission of downlink bandwidth allocation every transmission cycle and slave MHR 104 updating, on a frame by frame basis, its schedule in preparation for receiving at least downlink bandwidth allocation data.

In step 406 of method 400, slave MHR decodes PDFSCCh, containing data associated with downlink bandwidth allocations. This may be the downlink bandwidth allocation data itself or data generated based on the downlink bandwidth allocation data indicating any change in the DL BW allocation of the previous frame or, in some embodiments, previous frames. One example of data generated based on the downlink bandwidth allocation data can be seen in FIG. 3, which shows one exemplary downlink bandwidth lookup table, and in Table 1, below. In one example of step 406, slave MHR 104 accesses a downlink control channel which includes information concerning the lookup table which is updated and transmitted by the hierarchical MHR, on a frame by frame basis at least when one or more changes to the downlink bandwidth allocation have occurred.

In decision step 408 method 400 utilizes data received and processed in step 404 to determine if changes have occurred in downlink bandwidth allocations.

If in step 408 method 400 determines that changes to the downlink bandwidth allocation have occurred on a frame-by-frame basis then decision step 408 moves to step 410, where control PHY and MAC data are received, decoded, and processed in step 412. Step 414 then utilizes the decoded PHY and MAC data for IP stack processing, if frame-by-frame bandwidth allocation changes were detected, at which point, in step 416, method 400 transmits data as determined by the scheduled new downlink bandwidth allocation data. Method 400 then moves to step 406. If, in step 408, method 400 determines no downlink bandwidth allocation changes have occurred then method 400 moves to step 418.

In step 418 method 400 bypasses MAC/IP Stack data access and allocated bandwidth utilizing the same downlink bandwidth allocation as was used in the previous frame. That is, method 400, at step 418, transmits data as prescribed by the previous PHY allocations for the MHR clients such that MAC processing cycles are not changed and no changes to the scheduler occur. It will be understood that changes to the hierarchical MHR scheduler may still occur (executed by the master MHR). Thus, PHY allocations for the MHR clients are unchanged from the previous frame. This eliminates MAC and IP Stack processing, which are much slower in terms of processing time than the PHY processing. The results in an end-to-end user latency improvement. The one-way end to end latency improvement may be in the range of, for example, 5-50 ms. It will be understood by the skilled artisan that this is MAC/IP Stack implementation dependent. In a simplified system, step 418 returns to step 408 after completion. Optionally, method 400 moves to an idle mode process function starting at step 420.

In decision step 420, method 400 determines if an optional idle mode is initiated, for example, by the hierarchical MHR. If idle mode is not initiated, step 420 moves to step 426, see below. If in step 420 it is determined that idle mode will be initiated then step 420 moves to step 422, which initiates idle mode. One example of steps 420 and 422 is slave MHR 104 receiving instructions to initiate idle mode for a set period of time or a set number of frames. Step 422 then moves to step 424.

In decision step 424, method 400 determines if the set period of time or set number of frames has expired. If in step 424 method 400 determines that the set period of time or set number of frames has not expired step 424 moves to step 427, otherwise method 400 moves to step 425. In step 427 method 400 determines if a wake-up request has been received. If a wake-up request has not been received method 400 moves to step 422, otherwise method 400 moves to step 410. If in step 424 method 400 determines that the set period of time or set number of frames has expired, then step 424 moves to step 425.

In decision step 425, method 400 determines if idle mode should be reactivated. If it is determined in step 425 that idle mode should be reactivated, method 400 moves to step 422. If it is determined in step 425 that idle mode should not be reactivated, method 400 moves to step 410, as described above. Alternatively, method 400 may move to decision step 408.

Returning to method 400, moving from step 420 to step 426, which describes method 400 entering an optional sleep mode processing function. In step 426, method 400 determines if a sleep mode is to be initiated, based on the local requirements for transmission (e.g. data buffer size). In one example of step 426, slave MHR 104 determines that no new PHY allocations have occurred, for example, by determining that an associated transmission data buffer is empty, for a predetermined number of frames at which point the node places itself in sleep mode. If in step 426, method 400 determines that sleep mode is not to be initiated, then method 400 returns to step 408. If method 400 determines that sleep mode is to be activated, then method 400 moves to step 428.

In step 428 method 400 initiates sleep mode. One example of step 428 is slave MHR 104 placing itself in sleep mode. In an embodiment, initiating a sleep mode includes switching off at least some of PHY and MAC processing for purposes of power savings. Method 400 then moves to step 430, where method 400 monitors PDFSCCh data to determine the presence of a paging wake-up call request. In one example of step 430, slave MHR 104, while in sleep mode, continues to process PHY data, e.g., PDFSCCh data, received from master MHR 102. Slave MHR 104 examines the received PHY data to identify a paging wake-up call request, which maybe in the form of a change to DL bandwidth allocation or may be a dedicated wake-up signal.

Method 400 then moves to decision step 432, where method 400 determines if a paging wake-up request was identified in step 430. If method 400, in step 432, determines that a paging wake-up request was identified in step 430 then method 400 moves to step 406, described above. Alternatively method 400 may move to step 406. In one example of step 432, slave MHR 104 determines that a paging wake-up request has been identified and slave MHR 104 wakes from sleep mode and processes the IP Stack. If in step 432 method 400 determines that no paging wake-up request was identified in step 430, then method 400 moves to step 428.

Figure 5:
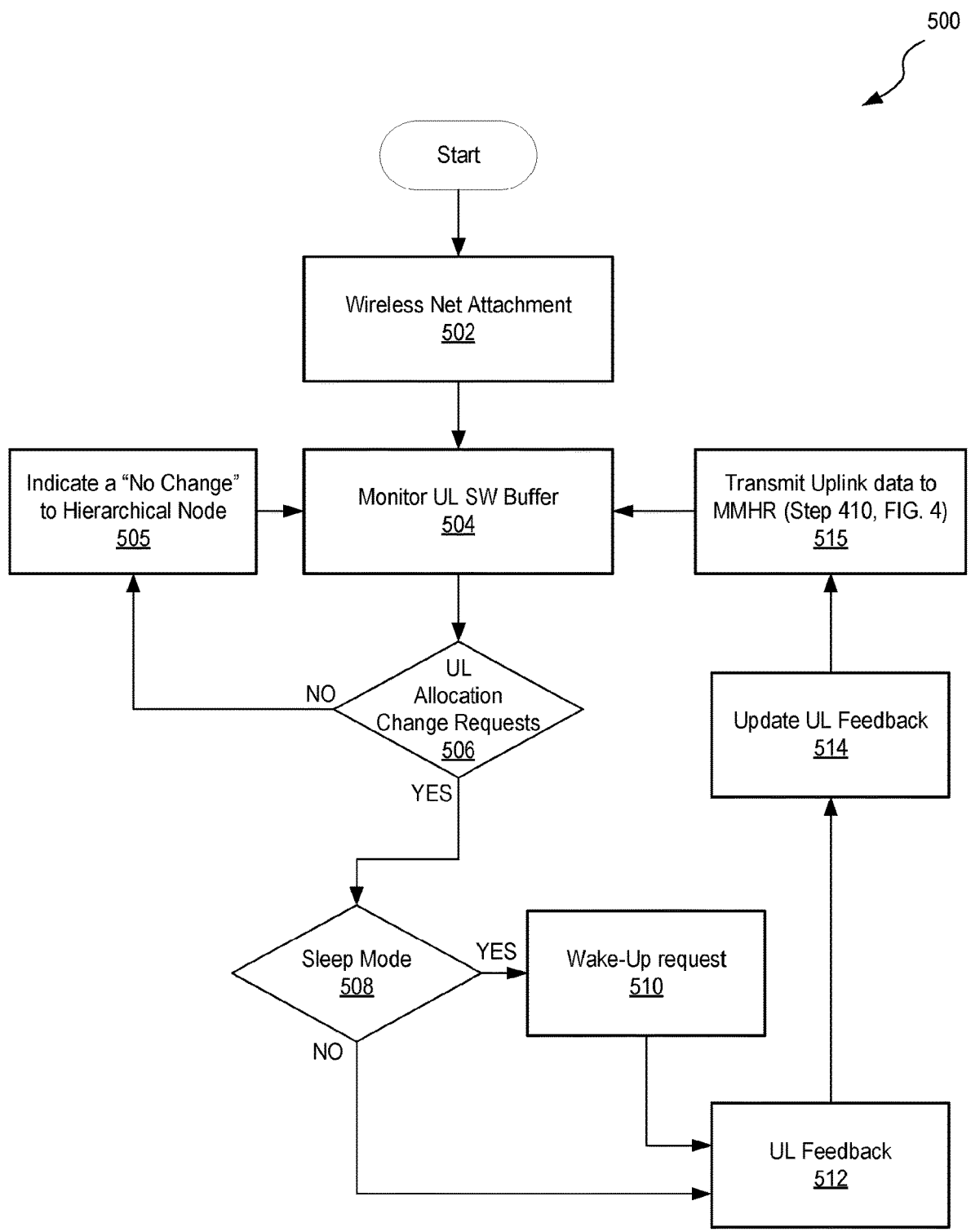
FIG. 5 is a flowchart illustrating one exemplary method for slave MHR uplink bandwidth (UL BW) allocation feedback, in an embodiment.

FIG. 5 shows one exemplary uplink bandwidth allocation feedback method 500. FIG. 5 is best viewed in combination with FIGS. 1 and 2C. In method 500, a slave MHR/pBS provides an uplink bandwidth allocation data request to the next hierarchical node in the system based on the status of an uplink software buffer. Herein, a software buffer is a buffer having variable size. For example, slave MHR 104 may use this method to update its aggregated uplink bandwidth allocation data request based on uplink data received from pBS 108, 110 and RU 155.

In step 502 of method 500, a slave MHR/pBS is initialized and connects to its hierarchical node, e.g., a master MHR. If the slave MHR/pBS has previously been initialized and connected to its hierarchical node method 500 skips step 502. One example of step 502 is slave MHR 104 establishing wireless communication with master MHR 102 during an initialization process at start-up or during a communication reestablishment process after communication loss. Method 500 then moves to step 504.

In step 504, method 500 monitors the uplink software buffer. One example of step 504 is slave MHR 104 monitoring its uplink software buffer 238 to detect if slave MHR 104 has new aggregated uplink bandwidth allocation request data 239 stored in software buffer 238 from one or more of pBS 108, 110, and RU 155. Some non-limiting examples of detecting a change include comparing current data with data from one or more previous frames, monitoring a change in the size of software buffer 238, and by monitoring a "change flag." Method 500 then moves to decision step 506.

In decision step 506, method 500 determines if a change to the uplink software buffer processed was detected in step 504. Some example of step 506 is slave MHR 104 determining if software buffer 238 changed size, if a "change flag" was activated, or if a comparison of current data 239 to old data 239 showed a difference between the two. If method 500 determines that no change to the uplink software buffer occurred in step 504, then method 500 moves to step 505 where method 500 indicates to the hierarchical node that there are no new uplink bandwidth allocation requests. One example of step 505 is slave MHR104 transmitting to the master MHR102 at least data 282 showing no change to uplink bandwidth allocation requests. For one example of the format of data 282 see Table 3, below. Alternatively, slave MHR 104 may not transmit any data to master MHR 102 during a frame, which may indicate to master MHR 102 that there is no change to the uplink bandwidth allocation data request. This allows master MHR102 to skip reading and processing bandwidth allocation headers of the uplink Ethernet headers and updating uplink control allocations. This is what is referred to herein as "fast signaling," a process which drastically reduces latency by reducing reading, processing, and writing steps. That is, fasting signaling allows a receiving device to process the minimum amount of data for purposes of bandwidth allocation (uplink or downlink), thereby reducing latency. Step 505 then moves to step 504. If method 500 determines that a change to the uplink software buffer has occurred, method 500 moves to decision step 508.

In step 508, method 500 determines if the device is in sleep mode. If method 500 determines the device is in sleep mode method 500 moves to step 510, where a wake-up request is executed. Step 510 then moves to step 512 where method 500 registers uplink feedback data in the software buffer, then moves to step 514 where method 500 updates uplink bandwidth allocation request data and uplink fast feedback data stored in memory, e.g., data 280 and 282, respectively. If, in step 508, method 500 determines that the device is not in sleep mode, then method 500 moves to step 512 where method 500 registers uplink feedback data, then moves to step 514 where method 500 updates uplink bandwidth allocation request data and uplink fast feedback data stored in memory. One example of steps 508, 510, 512, and 514 is slave MHR 104 processing a wake-up call, registering new uplink feedback data 239, and updating uplink bandwidth allocation request data 280 and uplink fast feedback data 282 stored in memory 220 based on the registered data 239. One example of steps 512 and 514 is slave MHR104 updating uplink bandwidth allocation request data 280 and uplink fast feedback data 282 stored in memory 220 based on the registered data 239. Method 500 then moves to step 515.

In step 515 method 500 transmits updating uplink bandwidth allocation request data 280 and uplink fast feedback data 282 to the master MHR for incorporation into step 410 of method 400, FIG. 4. In one example of step 515 slave MHR 104 transmits updating uplink bandwidth allocation request data 280 and uplink fast feedback data 282 every transmission cycle. In another example of step 515 slave MHR 104 only transmits updating uplink bandwidth allocation request data 280 and uplink fast feedback data 282 when there is a change to the data. In this example, if there are no changes to the uplink allocation feedback data then no uplink allocation feedback data is sent. Method 500 then moves to step 504, described above.

Table 1, below, shows one exemplary downlink look-up table for fast signaling, which shows signaling used in downlink and uplink processing and describes a non-limiting case of 16 slaves attached to one master node.

Table 1 includes three columns, a "Word (hex)" column, a "User Name" column, and a "Comment Word (H)" column. The hexadecimal notion in the "Word (hex)" column identifies the user (shown in the "User Name" column) and identifies if any changes have occurred to that user's downlink bandwidth allocation and/or uplink bandwidth allocation. For example, 0x00 through 0x03 cover changes to Slave 00's downlink (0x00 through 0x01) and uplink bandwidth allocation (0x02 through 0x03), 0xF0 through 0xF3 cover changes to Slave 04's downlink and uplink bandwidth allocation, etc. It will be understood that the signal scheme shown in the tables below are only examples of possible methodologies and other may be utilized without departing from the scope herein.

TABLE 1

Downlink/Uplink Fast Signaling Allocation Table

| Word (hex) | User Name | Comments Word |
|---|---|---|
| 0x00 | Slave 00 | 0: no DL BW allocation change; |
| 0x01 | Slave 00 | 1: DL BW allocation change |
| 0x02 | Slave 00 | 0: no UL BW allocation change; |
| 0x03 | Slave 00 | 1: UL BW allocation change |
| ... | | |
| 0xF0 | Slave 04 | 0: no DL BW allocation change; |
| 0xF1 | Slave 04 | 1: DL BW allocation change |
| 0xF2 | Slave 04 | 0: no UL BW allocation change; |
| 0xF3 | Slave 04 | 1: UL BW allocation change |

TABLE 1-continued

Downlink/Uplink Fast Signaling Allocation Table

| Word (hex) | User Name | Comments Word |
|---|---|---|
| ... | | |
| 0x3C | Slave 15 | 0: no DL BW allocation change; |
| 0x3D | Slave 15 | 1: DL BW allocation change |
| 0x3E | Slave 15 | 0: no UL BW allocation change; |
| 0x3F | Slave 15 | 1: UL BW allocation change |

Each hierarchical slave is associated with a master MHR and has 4 entries in its Downlink/Uplink Fast Signaling Allocation Table, Table 1. Table 1 summarizes downlink (DL) and uplink (UL) PHY allocations on a frame by frame basis. UL subsections reflect the information received from UL feedback fast signaling channel and represents a confirmation of UL allocation requests made by, for example, slave MHR 104.

The number of entries in Table 1, represented in the equation below as 'W', is equal to four times the number of users ('n'). Note that in the present embodiment n≤16, although 'n' may be increased, for example, to 32 or 64 in other embodiments. Thus:

$$W = n * 4, \quad (1)$$

where:
W=the number of downlink lookup table entries, and
n=number of users.

A user value set, '$w_{d1}$', is described in Table 2, below. The user value set describes the entries in the DL Look-Up table for each user, which describes the behavior of a user in terms of DL and UL fast signaling changes. The user value set '$w_{d1}$' relates to the "Comments Word" shown in FIG. 1, above.

TABLE 2

| $W_{d1}$ | no DL allocation change |
| | DL allocation change |
| | no UL allocation change |
| | UL allocation change |

If a slave device determines, during the decoding of the Downlink/Uplink Fast Signaling Allocation data as shown in Table 1, that there is a change in the downlink and/or uplink bandwidth allocation then the slave device will decode the related PHY/MAC/IP Stack data to retrieve the new DL and/or UL bandwidth allocation data. If no change is determined during the decoding of the Downlink/Uplink Fast Signaling Allocation Table then the slave device will utilize the same DI and UL bandwidth allocation as was utilized in the previous frame.

If a slave device detects no downlink or uplink bandwidth allocation change, the respective device processes the same PHY bandwidth allocation as was processed in the last frame or set of frames. Thus, a slave device will process the respective bandwidth allocation much faster, for example, by 5-50 ms faster depending on implementation. This dramatically reduces the one way end-to-end user packets latency accordingly.

As described in method 400, a device may be sent into idle mode. In an embodiment, idle mode may be initiated by the detection of a bandwidth allocation pattern. For example, a device which detects a bandwidth allocation pattern sequence for a given user, for example, "0x00/0x03" for a predetermined number of frames may switch to idle mode.

A device in idle mode transmits no RF energy to its users, thus saving energy and reducing the intra-cell and inter-cell interference. In addition, a device in idle mode may continue to monitor the DL Lookup Table of the hierarchical MHR master, transmitted over the PDFSCCh. A device in idle mode may be returned to active mode via another designated sequence or when a change to a DL or UL bandwidth allocation is detected.

Table 3, below, shows one exemplary Uplink MHR Feedback Table for fast processing of one or more uplink bandwidth allocation change requests. Table 3 describes signaling used in uplink feedback processing and represents one non-limiting case of 16 slaves attached to one master node. Similar to Table 1, Table 3 includes a "Word (hex)" column and a "User Name" column. Table 3 differs from Table 1 in that Table 3 replaces the "Comment Word (hex)" column of table 1 with a "Comments (CR: Change Request)" column. The hexadecimal notion in the "Word (hex)" column identifies a user, shown in the "User Name" column and also identifies any change to the uplink bandwidth allocation for that user or if a wake-up request or a sleep request has been sent for that user. For example, 0x00 through 0x03 cover changes to Slave 00's uplink (0x00 through 0x01) and wake-up request (0x02), and sleep request (0x03).

TABLE 3

Uplink MHR Feedback Table

| Word (H) | User Name | Comments (CR: Change Request) |
| --- | --- | --- |
| 0x00 | Slave 00 | 0: no UL BW allocation CR; |
| 0x01 | Slave 00 | 1: UL BW allocation CR |
| 0x02 | Slave 00 | 0: wake-up request |
| 0x03 | Slave 00 | 1: sleep request |
| ... | | |
| 0xF0 | Slave 04 | 0: no UL BW allocation CR; |
| 0xF1 | Slave 04 | 1: UL BW allocation CR |
| 0xF2 | Slave 04 | 0: wake-up request |
| 0xF3 | Slave 04 | 1: sleep request |
| ... | | |
| 0x3C | Slave 15 | 0: no UL BW allocation CR; |
| 0x3D | Slave 15 | 1: UL BW allocation CR |
| 0x3E | Slave 15 | 0: wake-up request |
| 0x3F | Slave 15 | 1: sleep request |

Each hierarchical slave is associated with a master MHR and has 4 entries in its Uplink MHR Feedback Table, Table 3. The number of Uplink MHR Feedback Table entries ('W') is equal to four times the number of users ('n'), similar to Table 1 described above. Note that in the present embodiment n≤16, although 'n' may be increased without departing from the scope herein. Thus, as similarly described above for equation (1), W=n*4, where: W=the number of downlink lookup table entries and n=number of users.

A user value set, '$W_{ul}$' described in Table 4 below, for Uplink MHR Feedback Table differs from that of that of the Downlink/Uplink Fast Signaling Allocation Table. While the Uplink MHR Feedback Table reflects the status of the slave MHR device uplink software buffer and accordingly the request for change in the uplink PHY allocation, the master MHR, e.g., master MHR 102, may confirm the received feedback by broadcasting the changes in uplink PHY allocation requests.

TABLE 4

| $W_{ul}$ | no UL BW allocation CR |
| --- | --- |
| | UL BW allocation CR |
| | wake-up flag |
| | sleep request |

When a master MHR detects an uplink bandwidth allocation change request (CR) transmitted by a client device (e.g., Slave 00, RU 150, etc.), the master MHR device decodes the associated PHY/MAC information to process the related allocation size and location. The master MHR then passes this information to the master MHR scheduler to schedule resource for the requesting client device.

If no uplink bandwidth allocation change request is detected from a client device then the master MHR will not change the related uplink bandwidth allocation for that client. One exception may be when the scheduler can't comply with this request due to conflicts associated with bandwidth allocation to neighboring devices. Similarly the master MHR may not change downlink bandwidth allocation for that client due to conflicts. Is such cases, changes to uplink and downlink bandwidth allocations may be pushed to the next frame.

PDFSCCh and PUFFCh-PHY Support

The Downlink/Uplink Fast Signaling Allocation Table entries, also called the downlink lookup table entries, are transmitted using a Constant Amplitude Zero Autocorrelation (CAZAC) function. One example of such a CAZAC function is a simplified form of the Zadoff-Chu (ZC) function, described below:

$$x_u = \exp\left[-j\frac{\pi u n(n+1)}{N_{ZC}}\right], 0 \le n \le N_{ZC} \quad (2)$$

Where $x_u$ is the function value,
j is the complex number $(-1)^{1/2}$,
u is the ZC sequence index,
n is the position of each root Zadoff-Chu sequence, and
$N_{ZC}$ is the prime length, which is a positive integer, in order to minimize the unwanted cross-correlation products of the ZC function.

Here we utilize the Chu sequence, which is a special case of the Zadoff-Chu sequence where q=0:

$$x_u = \exp\left[-j\frac{\pi u n(n+1)}{N_{ZC}}\right], 0 \le n \le N_{ZC} \quad (3)$$

The output sequence of equation (3) is a complex-valued column vector that contains the $u^{th}$ root Zadoff-Chu sequence of length $N_{ZC}$.

The ZC function is one preferred method for this type of signaling due to its excellent peak to average power ratio (PAPR), auto-correlation properties, and cross correlation products of the same root.

The calculation of prime length $N_{ZC}$ is dependent on the length of the sequence, that is, it is dependent on the subframe/frame length for the specific modulation scheme and frame structure utilized. The related link budget for this signaling channel may be given by:

$$P_{Rx}=P_{Tx}-PL+G_{ANT\_Tx}+G_{ANT\_Rx}+10\log_{10}N_{ZC}, \quad (4)$$

where:
$P_{Rx}$=Received Rx Power for the Physical Fast Allocation Channel (PFACh)

$P_{tx}$=Transmitted Tx Power for the Physical Fast Allocation Channel (PFACh)

PL: Path Loss ([dB])

$G_{ANT\_Tx}$, $G_{ANT\_Rx}$: Tx and Rx antenna gains, and

Nzc: the length of the pseudo-chirp sequence (Zadoff-Chu in this case).

The ZC sequence length is limited by the related inter-carrier spacing and the supporting LO performance (phase noise), since the longer the ZC sequence, the smaller is the inter-carrier space, though the higher is the LO phase noise impact. For example, with $N_{ZC}=811$ a chirp sequence gain of 29.1 dB is produced.

Herein the Zero Correlation Zone (ZCZ) is defined as the minimum band value covering the maximum delay spread. The cyclic shift ($N_{CS}$) is represented by ZC sequences phase-shifted from a single root, providing orthogonality between sequences. The cyclic shift is, $$N_{CS} \geq \left[\left(\frac{20}{3}r - \tau\right)\frac{N_{ZC}}{T_{SEQ}}\right] + n_g [1]. \quad (5)$$

In one example with a cell radius of r=0.5 km, a 28 GHz delay spread such that t=0.7 ms, and $T_{SEQ}$=400 ms, $N_{ZC}$=811, $n_g$=25, $N_{CS}$=4. For $N_{ZC}$=811, results in $N_{CS} \geq 202$ possible cyclic shifts for one root available. This is more than sufficient when a D-FFT=64 is employed. This also could support a D-FFT 128, thus enlarging the amount of client devices to 32.

PDFSCCh and PUFFCh—PHY Support

Figure 6:
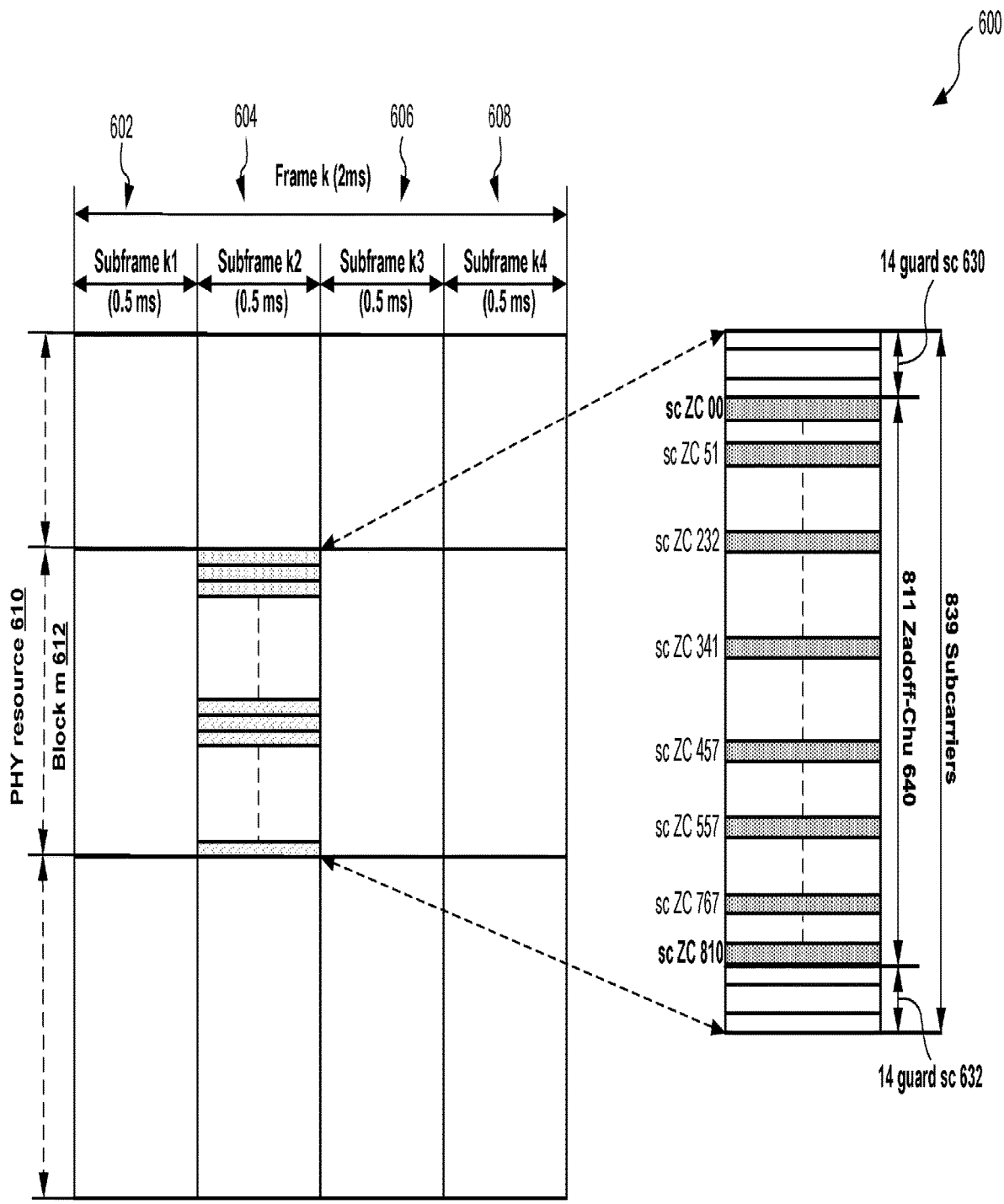
FIG. 6 shows one exemplary data frame transmission structure utilizing a Zadoff-Chu implementation, in an embodiment.

FIG. 6 shows frame (k) 600 of 2 milliseconds (ms) divided into four (4) subframes k1, k2, k3, and k4, each of 0.5 ms. Frame (k) may be the similar or different from frame (k) 352 of FIG. 3. For sake of simplicity and clarity of illustration only PHY resource 610's block m 612 of subframe k2 604 is shown in detail. The detailed view of subframe k2 604's block m 612 shows an implementation of a Zadoff-Chu based on $N_{ZC}$=811 resulting in 811 Zadoff-Chu subcarriers 640, scZC00-sc ZC810. 28 additional subcarriers are also used as guard subcarriers, 14 subcarriers 630 above and 14 subcarriers 632 below. Without losing generality other frame structures, different number of frames, and symbols/subframe, may be employed.

In the example provided above Nzc=811 was chosen for the ZC function. In order to avoid any cross carrier interference with the adjacent PHY subcarriers (e.g. OFDM, SC_FDMA or other modulations employed by the basic PHY) guard subcarriers are employed (14 on each side of the ZC subcarriers). Without losing generality other Zadoff-Chu function prime number orders could be chosen could be employed.

In an embodiment six (6) cyclic shifts, located on phase shifts larger than the related Zero Correlation Zone, are selected: in one example ZC subcarriers 51, 232, 341, 457, 557 and 767 provide the good cross auto-correlation products for the respective RF channel. In the present embodiment subcarrier scZC00 and subcarrier scZC810 are excluded. A slave device associated with a MHR will look for these six (6) specific subcarriers in the order specified above to decode the DL Look-Up Table 'W', which is a 6 bit word. Decoding a 6 bit word length DL Look-Up Table requires only 1-3 ms as compared to the 5-50 ms required to decode a the information carrier over the PHY/IP Stack. Therefore each one of the entries in the DL Look-up and UL Feedback tables, for up to 16 slave devices could be encoded using the above ZC function model. Without losing generality, selecting 8 ZC roots (instead of 6, as exemplified above) may increase the number of supported slave devices to 64.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A system for bandwidth allocation, comprising:
   a parent multi-hop relay including a processor and non-transitory memory storing computer readable instructions that, when executed by the processor, cause the parent multi-hop relay to:
   associate the parent multi-hop relay with at least one child device and at least one grandchild device associated with one of the at least one child device;
   generate, at the parent multi-hop relay, bandwidth allocation data, the bandwidth allocation data defining a parent-child bandwidth allocation between the parent multi-hop relay and each child device, and a child-grandchild bandwidth allocation between the at least one child device and each grandchild device;
   transmit, from the parent multi-hop relay, the bandwidth allocation data to each at least one child device.

2. The system of claim 1, the parent-child bandwidth allocation being greater than the child-grandchild bandwidth allocation.

3. The system of claim 1, wherein the parent multi-hop relay provides converged access to each of the at least one child device and associated at least one grandchild device.

4. The system of claim 1, at least one of the at least one child device and the at least one grandchild device being a base station.

5. The system of claim 1, the bandwidth allocation data including, for each of the at least one child device and the at least one grandchild device, fast-signaling data field defining whether bandwidth for the given device is changed in a current bandwidth allocation data as compared to previous bandwidth allocation data.

6. The system of claim 1, the bandwidth allocation data including a plurality of frames, wherein bandwidth for a given device in a first frame of the plurality of frames is different than bandwidth allocated to the given device in a second frame of the plurality of frames.

7. The system of claim 1, the bandwidth allocation data being transmitted on a PHY fast signaling control channel.

8. The system of claim 1, the bandwidth allocation data being transmitted on a MAC fast signaling control channel.

9. The system of claim 1, at least one of the parent, child, and grandchild being a device defined by a 3GPP protocol.

10. The system of claim 1, at least one of the parent, child, and grandchild being a 5G device.

11. A system for bandwidth allocation, comprising:
    a child device including a processor and non-transitory memory storing computer readable instructions that, when executed by the processor, cause a parent multi-hop relay to:
    receive, from a parent multi-hop relay, bandwidth allocation data, a child-grandchild bandwidth allocation between the child device at least one grandchild device associated with the child device; and allocate bandwidth between the child device and the at least one grandchild device based on the bandwidth allocation data;

wherein the child-grandchild bandwidth allocation is less than a parent-child bandwidth allocation between the parent multi-hop relay and the child device.

12. The system of claim 11, wherein the child device and the grandchild device obtaining converged access from the parent multi-hop relay.

13. The system of claim 11, at least one of the child device and the at least one grandchild device being a base station.

14. The system of claim 11, the bandwidth allocation data including, for each of the at child device and the at least one grandchild device, fast-signaling data field defining whether bandwidth for the given device is changed in a current bandwidth allocation data as compared to previous bandwidth allocation data.

15. The system of claim 11, the bandwidth allocation data including a plurality of frames, wherein bandwidth for a given device in a first frame of the plurality of frames is different than bandwidth allocated to the given device in a second frame of the plurality of frames.

16. The system of claim 11, the bandwidth allocation data being received on a PHY fast signaling control channel.

17. The system of claim 11, the bandwidth allocation data being received on a MAC fast signaling control channel.

18. A method for allocating bandwidth in a hierarchical structure comprising:

receiving, at a first device operating in an active mode, bandwidth allocation data over a plurality of wireless transmission frames;

when the bandwidth allocation data indicates that no change in bandwidth allocation is to occur between a wireless transmission frame and a previous wireless transmission frame, activating a low-power mode of the first device the low-power mode having lower-power than the active mode.

19. The method of claim 18, the activating the low-power mode comprising activating an idle mode.

20. The method of claim 19, the activating the idle mode including activating the idle mode for a set period.

21. The method of claim 19, the activating the idle mode including activating the idle mode for a set number of additional wireless transmission frames.

22. The method of claim 19, further comprising:
receiving, at the first device operating in the idle mode, a wake-up request; and,
activating the active mode of the first device in response to the wake-up request.

23. The method of claim 19, the activating the low-power mode comprising activating a sleep mode.

24. The method of claim 23, further comprising monitoring a transmission data buffer of the first device; and implementing the controlling the first device to the sleep mode based on the level of the transmission data buffer.

25. The method of claim 23, further comprising monitoring a transmission data buffer of the first device; and implementing the controlling the first device to the sleep mode when the transmission data buffer is empty for the predetermined number of wireless transmission frames.

26. The method of claim 23, further comprising:
receiving a wake-up request at the first device; and,
the active mode of the first device in response to the wake-up request.

\* \* \* \* \*